United States Patent [19]

Suzuki et al.

[11] Patent Number: 4,874,481
[45] Date of Patent: Oct. 17, 1989

[54] N,N'-DIPHENYLBENZIDINE POLYMER AND METHOD OF PRODUCING THE SAME

[75] Inventors: Tetsuro Suzuki, Fuji; Masao Yoshikawa, Numazu; Akio Kojima, Hiratsuka, all of Japan

[73] Assignee: Ricoh Company, Ltd., Tokyo, Japan

[21] Appl. No.: 188,756

[22] Filed: May 2, 1988

Related U.S. Application Data

[63] Continuation of Ser. No. 900,414, Aug. 26, 1986, abandoned.

[30] Foreign Application Priority Data

Sep. 2, 1985 [JP] Japan .................. 60-191991

[51] Int. Cl.$^4$ .................. C25B 3/00; C25B 3/10
[52] U.S. Cl. .................. 204/59 R; 252/500
[58] Field of Search .................. 204/59 R; 528/422; 252/500

[56] References Cited

U.S. PATENT DOCUMENTS

| | | | |
|---|---|---|---|
| 4,127,454 | 11/1978 | Torii et al. | 204/59 R |
| 4,505,843 | 3/1985 | Suzuki et al. | 252/500 |
| 4,519,938 | 5/1985 | Papir | 252/500 |
| 4,565,860 | 1/1986 | Murofushi et al. | 252/500 |
| 4,566,955 | 1/1986 | Naarmann | 204/59 R |
| 4,629,540 | 12/1986 | Genieès et al. | 528/422 |

OTHER PUBLICATIONS

Serve, D. "Electrochemical Properties of Diphenylamines and Their Oxidation Products in Organic Media-IV, The p-monosubstituted Diphenylamines and the Mechansim of Coupling Product Formation for Different Diphenylamines" Electrochim. Acta 1976, 21(12), 1171-81).

Diaz, A. F. et al "Electroactive Polyaniline Films" J Electroanal. Chem. 111 (1980) pp. 111-114.

Primary Examiner—John F. Niebling
Assistant Examiner—Steven P. Marquis
Attorney, Agent, or Firm—Oblon, Spivak, McClelland, Maier & Neustadt

[57] ABSTRACT

An N,N'-diphenylbenzidine polymer and a method of producing the N,N'-diphenylbenzidine polymer by electrochemical polymerization of N,N'-diphenylbenzidine having the formula are disclosed:

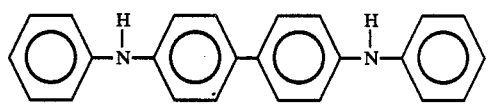

15 Claims, 5 Drawing Sheets

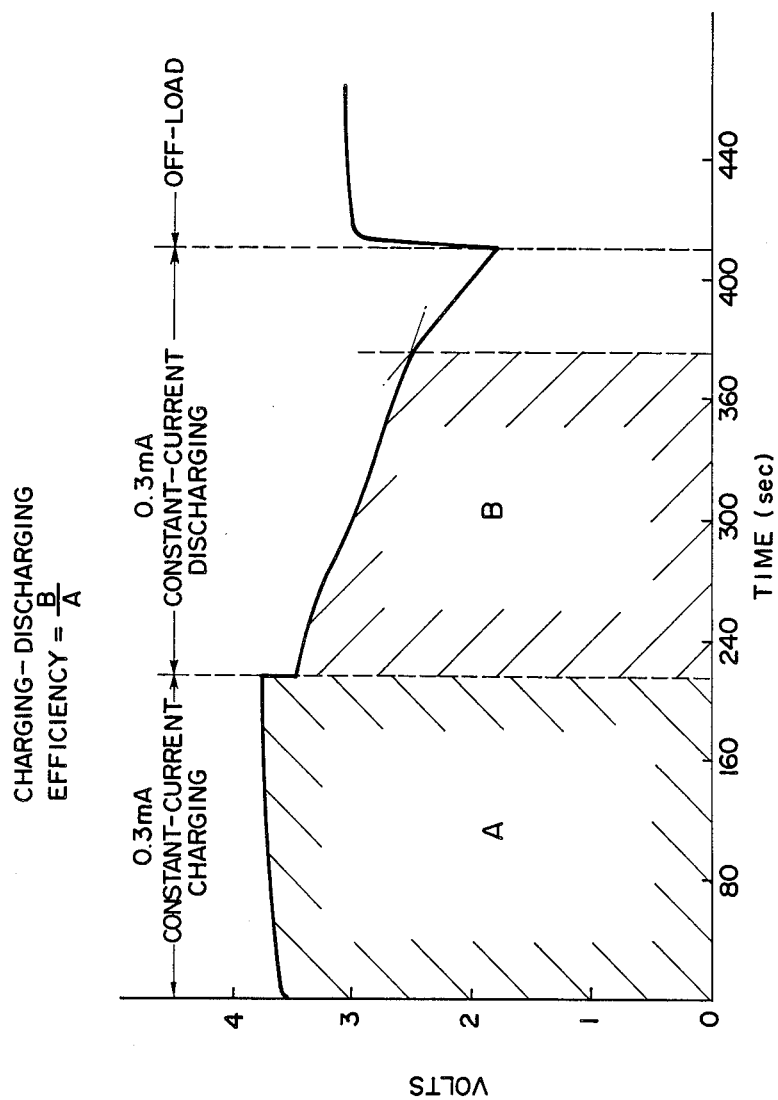

N,N'-DIPHENYLBENZIDINE POLYMER AND METHOD OF PRODUCING THE SAME

This application is a continuation of application Ser. No. 900,414, filed on Aug. 26, 1986, now abandoned.

BACKGROUND OF THE INVENTION

The present invention relates to a novel polymer and a method of producing the same, and more particularly to N,N'-diphenylbenzidine polymer and a method of producing the N,N'-diphenylbenzidine polymer produced by electrochemical polymerization of N,N'-diphenylbenzidine.

Recently research and development of functional polymer compounds are actively performed since it is well expected that they will become exceedingly useful materials for use in electronics.

For instance, as such materials for use in electronics, polypyrrole, polythiophene, polyaniline and polyacetylene have been reported.

Of a variety of methods of producing these functional polymers, electrochemical polymerization has lately attracted considerable attention.

The electrochemical polymerization is performed by dissolving a monomer and an electrolyte in water, an organic solvent, or a mixture of water and an organic solvent, immersing a pair of electrodes in the solution and applying a predetermined voltage across the electrodes, so that a polymer is deposited at the surface of one of the electrodes.

The following are representative examples of polymers which are reported as being produced by electrochemical polymerization:
(1) Polypyrrole: U.S. Pat. No. 3,574,072,
   A.F. Diaz et al., J.C.S. Chem. Comm., 635 (1979)
   A. F. Diaz et al., J.C.S. Chem. Comm., 854 (1979)
(2) Polythiophene: K. Kaneto et al., J.C.S. Chem. Comm., 381 (1983)
(3) Polyaniline:
   A. F. Diaz et al., J. Electroanal. Chem., 111, 111 (1980)
   T. Ohsaka et al., J. Electroanal. Chem., 161, 399 (1984)

Monomers from which electrochemically active polymers are prepared by electrochemical polymerization are limited to the monomers, pyrrole, thiophene and aniline for the above-mentioned polymers, and pyrrole derivatives, thiophene derivatives, furan, and aniline derivatives.

Neither N,N'-diphenylbenzidine polymer itself nor a method of producing the same has been known. As a matter of course, it has not been known that N,N'-diphenylbenzidine polymer can be produced by electrochemical polymerization of N,N'-diphenylbenzidine.

SUMMARY OF THE INVENTION

It is therefore an object of the present invention to provide an N,N'-diphenylbenzidine polymer which is prepared from an N,N'-diphenylbenzidine monomer which has not been employed for such polymerization.

Another object of the present invention is to provide a method of producing the above N,N'-diphenylbenzidine polymer by electrochemical polymerization of N,N'-diphenylbenzidine.

According to the present invention, the above objects of the present invention have been achieved by electrochemical polymerization of an N,N'-diphenylbenzidine monomer having the following formula:

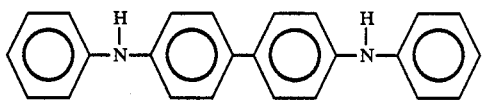

The thus prepared N,N'-diphenylbenzidine polymer is electrochemically active. Among other applications, it can be used as electrochromic material for use in an electrochroic display device and as a material for an electrode of an organic battery.

BRIEF DESCRIPTION OF THE DRAWINGS

In the drawings,

FIG. 7 is a diagram showing the charging and discharging characteristics of a secondary battery in which an N,N'-diphenylbenzidine polymer film is used as an electrode material.

DETAILED DESCRIPTION OF THE PREFERRED EMBODIMENTS

Figure 1:
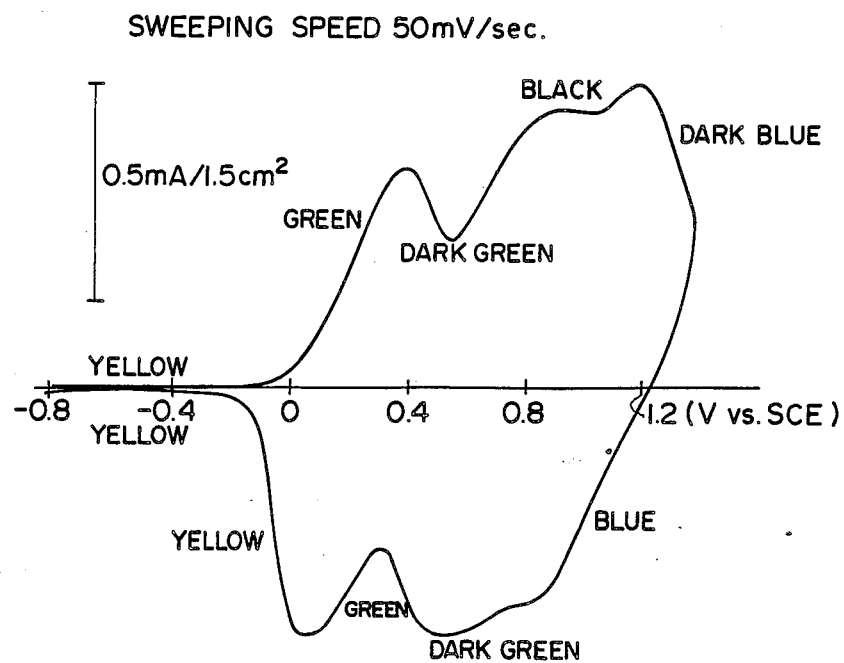
FIG. 1 is a cyclic voltagram of an N,N'-diphenylbenzidine polymer film produced by the method according to the present invention.

The electrochemical polymerization in the present invention is performed by dissolving an N,N'-diphenylbenzidine monomer and an electrolyte in water, an organic solvent, or a mixture of water and an organic solvent, immersing a pair of electrodes in the solution and applying a predetermined voltage across the two electrodes, so that a polymer is deposited at the surface of one of the electrodes.

As the solvent for use in the above electrochemical polymerization, solvents having relatively high dielectric constant and capable of dissolving electrolytes can be employed. Specific examples of such solvents are acetonitrile, benzonitrile, propylene carbonate, alcohol, dimethylformamide, nitrobenzene, N-methylpyrrolidone, tetrahydrofuran and dimethyl sulfoxide. These solvents can be used alone or in combination.

It is preferable that such solvents be distilled before use in order to remove impurities therefrom.

As the electrolyte, organic and inorganic salts, double salts, complex salts and inonic dyes, which are soluble in the organic solvents or easily dissociate into ions in the organic solvents, can be employed.

Specific examples of the electrolyte are (n-C$_4$H$_9$)$_4$NClO$_4$, (C$_2$H$_5$)$_4$NBF$_4$, (C$_2$H$_5$)NHSO$_4$,

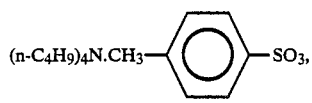

(C$_2$H$_5$)$_4$NPF$_6$, LiClO$_4$, NaAsF$_6$, AgBF$_4$ and Rose Bengale.

It is preferable that these electrolytes be purified and dried in vacuum before use. Further, it is preferable that the amount of the electrolyte used for electrochemical polymerization be in the range of 0.01 mol/l to 1.0 mol/l, more preferably in the range of 0.05 mol/l to 0.3 mol/l.

It is preferable that the amount of N,N'-diphenylbenzidine be in the range of 1 mmol/l to 1 mol/l although the amount varies with the solvent used in combination therewith.

Further it is preferable to use an additive which may eliminate hydrogen from the N,N'-diphenylbenzidine monomer or may accept hydrogen eliminated from the N,N'-diphenylbenzidine monomer in the course of electrochemical polymerization of the monomer.

Examples of such additive are a hydrogen acceptor (or a basic material), more specifically, heterocyclic organic compounds including nitrogen atoms having lone electron pairs such as pyridine, lutidine, collidine, pyrazine, pyridazine, pyrimidine, and triazine, and amines such as trialkylamine (for example, tri-n-butylamine).

It is preferable that the amount of such additive be in the range of 1/100 to 20 moles with respect to 1 mole of the N,N'-diphenylbenzidine monomer.

Of the above mentioned additives, pyridine, lutidine and collidine are particularly preferable for use in the electrochemical polymerization in the present invention.

The electrochemical polymerization can be performed either in a two-electrode cell or in a three-electrode cell. It is preferable that the polymerization be performed in a three-electrode cell because both potentiostat polymerization and current-constant polymerization can be performed in the three-electrode cell. When a three-electrode cell is employed, a conventional reference electrode can be employed. However, it is preferable to use a saturated calomel electrode (SCE) or a silver/silver halide electrode as the reference electrode.

When a saturated calomel electrode is employed, the electrochemical polymerization can be performed with application of 1 volt or more thereto. Further, potentiostat polymerization, current-constant polymerization and cyclic potential polymerization can also be employed in the present invention.

As the materials for the electrodes for the electrochemical polymerization, ITO glass, Nesa glass, platinum plate and carbon electrode can be employed as the working electrode, and platinum wire and nickel plate can be used as the counter electrode.

The present invention will now be explained in detail by referring to the following examples. However, the present invention is not limited to these examples.

EXAMPLE 1

The following components were mixed and stirred by a magnetic stirrer at room temperature, so that a polymerization solution was prepared.

| | |
|---|---|
| Acetonitrile (Solvent) | 20 ml |
| Tetra-n-butylammonium perchlorate (Electrolyte) | 0.68 g (0.1 mol/l) |
| 2,6-lutidine (Additive) | 0.11 g (0.05 mol/l) |
| N,N'—diphenylbenzidine (Monomer) | 0.03 g (4.5 mmol/l) |

The above polymerization solution was placed in an electrochemical polymerization cell of three-electrode type. This cell was provided with a working electrode made of an ITO glass having a size of 5×30 mm and a surface resistance of 20 to 30 Ω, a counter electrode made of a platinum wire, and a reference electrode of SCE.

A triangle potential wave having a cycle of 0 V to 2 V and back to 0 V was applied with a sweeping speed of 50 mV/sec to the SCE, so that electrochemical polymerization of N,N'-diphenylbenzidine was carried out. When the applied potential was elevated to about 0.7 V, the color of the surface of the working electrode became brown. At 1 V or more, the color became black or dark blue. When the potential was decreased to about 0.2 V, the color became green. When the potential decreased to zero volt, the color turned yellow. When the working electrode was taken out from the polymerization cell, it was found that a yellow polymer film was uniformly formed at the surface of the working electrode. It was found that the film firmly adhered to the surface of the working electrode.

With the above film-deposited working electrode placed in a propylene carbonate solution of tetra-n-butylammonium perchlorate (0.1 mol/l), a triangle potential wave having a cycle of −0.8 V to 1.4 V and back to −0.8 V was applied with a sweeping speed of 50 mV/sec to the SCE, so that the doping and undoping of the polymerized film were performed. As a result, a cyclic voltagram was obtained as shown in FIG. 1.

This polymer film was electrochemically active and the doping and undoping took place reversibly. In accordance with the reversible doping and undoping, the film was reversibly changed in color to light yellow to green to black (or dark blue). This film was insoluble in organic solvents such as dimethylformamide.

Figure 2:
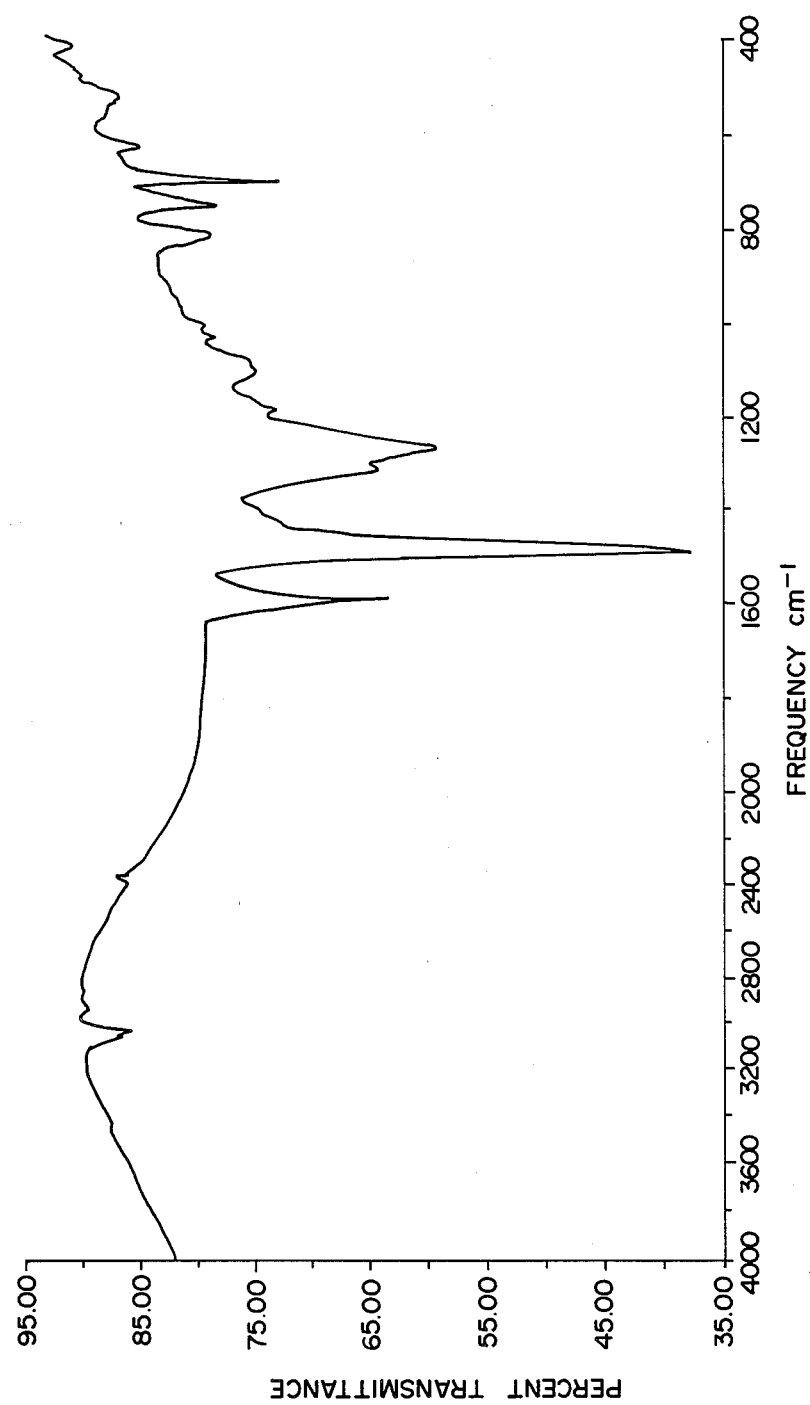
FIG. 2 is an IR spectrum of an undoped N,N'-diphenylbenzidine polymer film produced by the method according to the present invention.

The undoped film was peeled off the working electrode, washed with acetone and methanol for sure undoping, and dried in vacuum. FIG. 2 shows an infrared spectrum of the undoped film.

Figure 3:
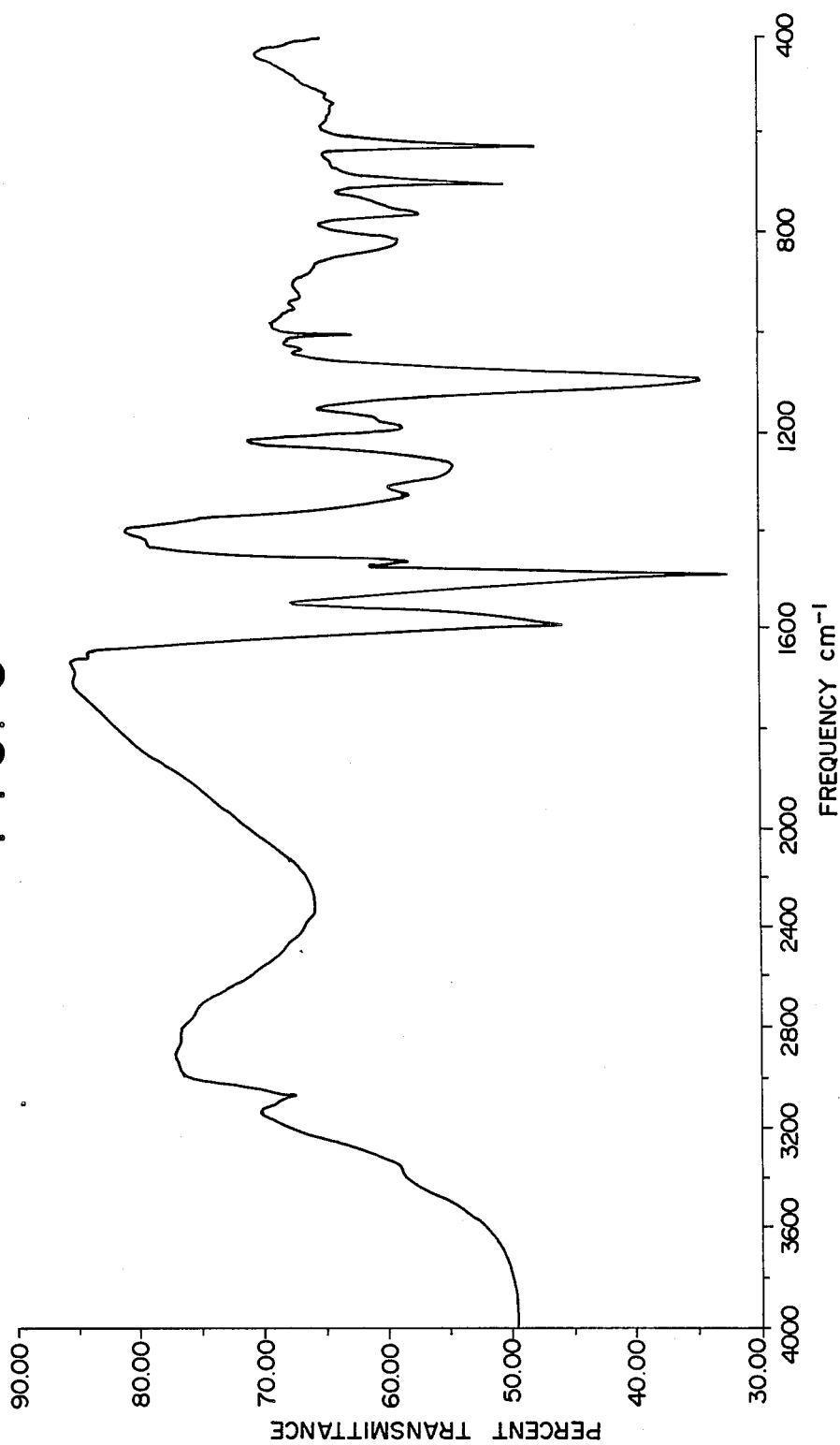
FIG. 3 is an IR spectrum of a doped N,N'-diphenylbenzidine polymer film produced by the method according to the present invention.

FIG. 3 shows an infrared spectrum of the doped film. This film was doped with a perchlorate ion (ClO$_4^\ominus$). The infrared spectrum in FIG. 3 indicates the characteristics absorption peaks of the dopant (ClO$_4^\ominus$ at 1095 cm$^{-1}$ and 621 cm$^{-1}$.

EXAMPLE 2

Example 1 was repeated except that acetonitrile employed as the solvent in Example 1 was replaced by nitrobenzene, whereby electrochemical polymerization of N,N'-diphenylbenzidine was performed. As a result, an electrochemically active film of N, '-diphenylbenzidine polymer was obtained as in Example 1.

EXAMPLE 3

Example 1 was repeated except that acetonitrile employed as the solvent in Example 1 was replaced by propylene carbonate, whereby electrochemical polymerization of N,N'-diphenylbenzidine was performed. As a result, an electrochemically active film of N,N'-diphenylbenzidine polymer was obtained as in Example 1.

EXAMPLE 4

Example 1 was repeated except that acetonitrile employed as the solvent in Example 1 was replaced by dimethylformamide, whereby electrochemical polymerization of N,N'-diphenylbenzidine was performed. As a result, an electrochemically active film of N,N'-diphenylbenzidine polymer was obtained as in Example 1.

EXAMPLE 5

Example 1 was repeated except that potentiostatic polymerization with a polymerization voltage of 1.5 V to the SCE was performed for 40 minutes instead of the application of the triangular wave voltage in Example 1, whereby electrochemical polymerization of N,N'-diphenylbenzidine was performed. As a result, an electrochemically active film of N,N'-diphenylbenzidine polymer which was black in color and had an uniform thickness of about 10 $\mu$m was obtained.

The above polymer film was washed with acetone and dried at reduced pressure at 80° C. for 8 hours. From this polymer film, two film samples I and II were made and were subjected to elemental analysis.

The results of the elemental analysis of the two film samples were as follows:

|  | % H | % C | % N |
|---|---|---|---|
| Sample I |  |  |  |
| 1st Analysis | 4.02 | 66.09 | 6.57 |
| 2nd Analysis | 3.96 | 66.22 | 6.51 |
| Sample II |  |  |  |
| 1st Analysis | 4.42 | 68.24 | 6.63 |
| 2nd Analysis | 4.25 | 65.86 | 6.43 |

In view of the above results, it is considered that the repeating structural units which make up the above polymer each have a structure similar to that of an N,N'-diphenylbenzidine monomer from which two or three hydrogens are eliminated. The amount of the dopant in the film was about 23 wt.%.

Another polymer film having a thickness of about 10 $\mu$m was prepared in the same manner as explained above. It was boiled in methanol for several hours. This boiling was repeated three times. The film was then dried at reduced pressure at 80° C. for 8 hours. From this polymer film, a film sample III was made and was subjected to elemental analysis.

The results of the elemental analysis of the film sample III were as follows:

|  | % H | % C | % N |
|---|---|---|---|
| Sample III |  |  |  |
| 1st Analysis | 4.34 | 74.09 | 7.05 |
| 2nd Analysis | 4.39 | 74.36 | 7.03 |

In view of the above results, it is considered that this polymer film can be undoped by boiling the film in methanol. By the above boiling, the doping ratio was reduced to about 14%.

EXAMPLE 6

Example 1 was repeated except that 2,6-lutidine employed as the additive in Example 1 was replaced by pyridine, whereby electrochemical polymerization of N,N'-diphenylbenzidine was performed. As a result, an electrochemically active film of N,N'-diphenylbenzidine polymer was obtained as in Example 1.

EXAMPLE 7

Example 1 was repeated except that 2,6-lutidine employed as the additive in Example 1 was replaced by 2,4,6-collidine, whereby electrochemical polymerization of N,N'-diphenylbenzidine was performed. As a result, an electrochemically active film of N,N'-diphenylbenzidine polymer was obtained as in Example 1.

The electrochemically active film of the N,N'-diphenylbenzidine polymer according to the present invention can be employed in a variety of electronic devices such as solar battery, secondary battery, image sensor, electrochromic display device and other display devices.

The following is an example of an electrochomic display device in which a film of the N,N'-diphenylbenzidine polymer according to the present invention is used as electrochromic material.

In the electrochromic display device, the above polymer film is applied to one of two electrodes, and an electrolyte is sealed between the applied polymer film and the other electrode. The lead wires from the two electrodes are connected to a power source and other circuits, so that the electrochromic display device is constructed.

In the electrochromic display device, at least one of the two electrodes must be a transparent electrode.

Figure 4:
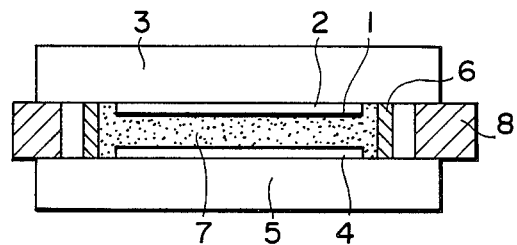
FIG. 4 is a schematic sectional view of an electrochromic display device in which an N,N'-diphenylbenzidine polymer film produced by the method according to the present invention is employed as the electrochromic material of the display device.

FIG. 4 is a schematical cross-sectional view of an example of an electrochromic display device using a N,N'-diphenylbenzidine polymer film according to the present invention. In the figure, reference numeral 1 indicates an electrochromic material made of the N,N'-diphenylbenzidine polymer film according to the present invention, which is applied to a transparent display electrode 2. Reference numeral 3 indicates a transparent substrate 3 for supporting the transparent display electrode 2. Reference numeral 4 indicates a counter electrode which is supported by a support member 5. Between the transparent display electrode 2 and the counter electrode 4, a solvent 7 containing an electrolyte is sealed through an electrically insulating spacer 6 (made of a Mylar or a teflon) by a sealing member 8.

Figure 5:
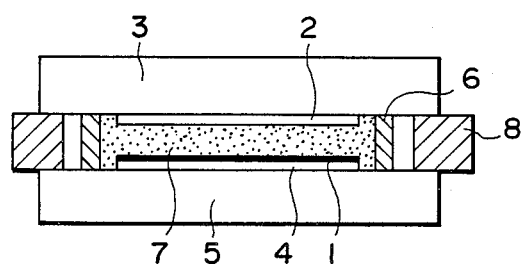
FIG. 5 is a schematic sectional view of another electrochromic display device in which an N,N'-diphenylbenzidine polymer film produced by the method according to the present invention is employed as the electrochromic material of the display device.

FIG. 5 is a schematic cross-sectional view of another example of an electrochromic display device using a N,N'-diphenylbenzidine polymer film according to the present invention. As shown in this figure, the electrochromic material 1 can be applied to the counter electrode 4 instead of being applied to the transparent display electrode 2.

The transparent display electrode is made of a transparent electrode material such as indium oxide, tin oxide or indium tin oxide. The counter electrode can also be made of the above-mentioned transparent electrode material. It also can be made of a metal such as platinum, gold and aluminum. The transparent substrate 3 and the support member 5 can be made of glass or a plastic.

The electrochromic phenomenon of polymers made by electrochemical polymerization is well known, in particular, with respect to polypyrrole, polythiophene and polyaniline. It is considered that this phenomenon is caused to take place by the changes of the electron state of the polymers, which are brought about by the doping of the polymers with a dopant (such as perchlorate ion, fluorine ion and iodine ion) and the reversible undoping thereof.

As the above mentioned solvent 7, a solvent having relatively high dielectric constant and capable of dissolving the electrolytes can be employed. Specific examples of such a solvent are acetonitrile, benzonitrile, propylene carbonate, alcohol, dichloromethane, chloroform, 1,2-dichloroethane, acetone, nitromethane, ethyl acetate, pyridine, tetrahydrofuran, dioxane, dimethylformamide, nitrobenzene, N-methylpyrrolidone, dimethyl sulfoxide, and water.

As the electrolyte, the following salts can be employed, which are soluble in the employed solvent: $LiClO_4$, $LiBF_4$, $NH_4ClO_4$, $(CH_3)_4NCl$, $(C_2H_5)_4NCl$, $(C_2H_5)_4NBr$, $(C_2H_5)NCN$, $(C_2H_5)_4NClO_4$, $(C_2H_5)_4NBF_4$, $(C_4H_9)_4NClO_b$ 4, $(C_4H_9)_4NBF_4$, $(C_4H_9)_4NHSO_4$, $AgClO_4$ and $AgBF_4$.

A specific example of an electrochromic display device using the N,N'-diphenylbenzidine polymer film according to the present invention will now be explained:

Example of Electrochromic Display Device

The following components were mixed and stirred by a magnetic stirrer at room temperature, so that a polymerization solution was prepared.

| | |
|---|---|
| Acetonitrile (Solvent) | 20 ml |
| Tetra-n-butylammonium perchlorate (Electrolyte) | 0.68 g (0.1 mol/l) |
| 2,6-lutidine (Additive) | 0.11 g (0.05 mol/l) |
| N,N'—diphenylbenzidine (Monomer) | 0.03 g (4.5 mmol/l) |

The above solution was placed in an electrochemical polymerization cell of a three-electrode type. This cell was provided with a working electrode made of an ITO glass having a size of 5×30 mm and a surface resistance of 20 to 30Ω, a counter electrode made of a platinum wire and a reference electrode of SCE.

Potentiostatic polymerization was performed with a polymerization voltage of 1.5 V applied to the SCE, whereby an electrochemically active film of N,N'-diphenylbenzidine polymer having a thickness of about 0.1 μm was deposited on the working electrode made of the ITO glass.

The film-deposited electrode was washed with methanol. An electrochromic display device was constructed by sealing a propylene carbonate solution of tetra-n-butylammonium perchlorate (0.1 mol/l) between the film-deposited electrode and another ITO glass through a Mylar spacer having a thickness of 13 μm.

In accordance with the increasing and decreasing of the voltage applied to this electrochromic display device, the doping and undoping of the deposited film took place reversibly so that the film was reversibly changed in color to light yellow to green to black (or dark blue), and back to green to light yellow.

Figure 6:
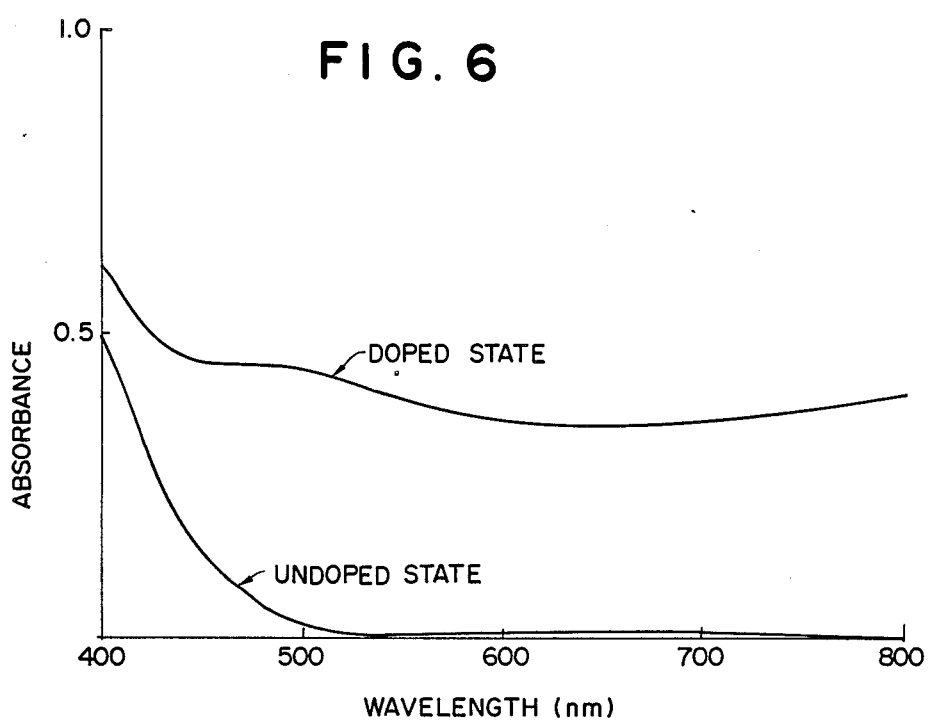
FIG. 6 is a diagram showing the difference in the absorption spectrum between a doped N,N'-diphenylbenzidine polymer film and an undoped N,N'-diphenylberzidine polymer film which were produced by the method according to the present invention.

FIG. 6 shows a spectrum of the film in the doped state and in the undoped state.

The thus fabricated electrochromic display device displayed an almost colorless color at the time of non-coloring and clear colors at the time of coloring. The reversible coloring performance was also excellent.

Polypyrrole, polythiophene and polyaniline prepared by electrochemical polymerization have been used at trial as the electrode material for secondary battery, for instance, in a polypyrrole-lithium battery, a polythiophene-lithium battery, and a polyaniline-lithium battery.

The N,N'-diphenylbenzidine polymer film according to the present invention can also be used as the electrode material in the same manner.

The reasons that these polymer films can be employed as the material of the electrode of secondary battery are considered as follows:

When a electric current is caused to flow through such polymer film in a certain direction in a solution containing an electrolyte with external application of a voltage thereto, the ion of the electrolyte which is called a dopant (such as $ClO_4^{\ominus}$ and $BF_4^{-}$) enters the polymer film and is fixed therein. In other words, the polymer film is doped with the dopant. This state corresponds to the charging state of the secondary battery. When the external application of the voltage is removed and the battery is connected, for instance, to a resistor, the ion of the electrolyte (i.e., the dopant), which has been fixed within the polymer film, flows into the solution, so that an electric current through the circuit of the battery in the direction opposite to the direction in the charging state. This state corresponds to the discharging state of the battery.

A specific example of a secondary battery using as an electrode material a N,N'-diphenylbenzidine polymer film according to the present invention is as follows:

Specific Example of Secondary Battery

The following components were mixed and stirred by a magnetic stirrer at room temperature, so that a polymerization solution was prepared.

| | |
|---|---|
| Acetonitrile (Solvent) | 20 ml |
| Tetra-n-butylammonium perchlorate (Electrolyte) | 0.68 g (0.1 mol/l) |
| 2,6-lutidine (Additive) | 0.11 g (0.05 mol/l) |
| N,N'—diphenylbenzidine (Monomer) | 0.03 g (4.5 mmol/l) |

The above formulation was the same as in Example 1. The above solution was placed in an electrochemical polymerization cell of a three-electrode type, which was disposed in a globe box with the atmosphere therein replaced with an argon gas. This cell was provided with a working electrode made of an ITO glass having a size of 13×23 mm and a surface resistance of 20 to 30 Ω and a counter electrode made of a nickel plate.

Under the above-mentioned conditions, electrochemical polymerization was performed with a constant electric current of 3 mA applied between the working electrode and the counter electrode, and the polymerization was continued until the total charge quantity during the polymerization amounted to 3.6 C, so that a N,N'-diphenylbenzidine polymer film was deposited on the working electrode made of the ITO glass.

Within the globe box, the polymer film deposited ITO glass was placed in a polypropylene carbonate solution of LiClO₄ with a concentration of 1 mol/l. As a counter electrode, a lithium electrode was employed, so that a secondary battery was constructed for investigating the charging and discharging characteristics thereof.

Charging was performed with a constant current of 0.3 mA (about 0.1 mA/cm²) and discharging was also performed with a constant current of 0.3 mA (about 0.1 mA/cm²). The charging and discharging characteristics of this battery were measured by use of a commercially available charge/ discharge unit (HJ-201B made by Hokuto-denko Co., Ltd.).

The results are shown in FIG. 7. The polymer film exhibited an open voltage of 3.46 V, a charging/discharging efficiency of about 80%, and an energy density of 23.7 Wh/kg for charging for 3.6 minutes using the lithium electrode. The energy density was not high, but the flatness of the on-load voltage during the 0.3 mA constant-current discharge was excellent. It is expected that the energy density will be increased when the discharge current is decreased.

What is claimed is:

1. An N,N'-diphenylbenzidine polymer prepared by electrochemically polymerizing N, N'-diphenylbenzidine having the formula (I) as monomer:

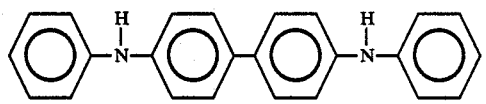
(I)

2. The N,N'-diphenylbenzidine polymer as claimed in claim 1, wherein said N,N'-diphenylbenzidine polymer is electrochemically doped with an electrolyte ion and undoped so as to eliminate said electrolyte therefrom.

3. The N,N'-diphenylbenzidine polymer as claimed in claim 1, wherein said N,N'-diphenylbenzidine polymer is electrochemically doped with an electrolyte ion and undoped so as to eliminate said electrolyte therefrom in a reversible manner.

4. The N,N'-diphenylbenzidine polymer according to claim 1, which is prepared by electrochemical polymerization.

5. A method of producing an N,N'-diphenylbenzidine polymer by electrochemical polymerization of N,N'-diphenylbenzidine having the formula (I):

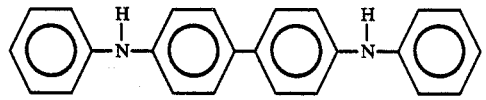
(I)

6. The method as claimed in claim 5, wherein said electrochemical polymerization is performed by the steps comprising:

dissolving N,N'-diphenylbenzidine, an electrolyte, and a hydrogen-eliminating or hydrogen-accepting additive in water, in an organic solvent or in a mixture of water and the organic solvent to prepare a polymerization mixture, and applying a predetermined voltage to said polymerization mixture through a pair of electrodes placed in said polymerization mixture, so as to deposit said N,N'-diphenylbenzidine polymer on one of said electrodes.

7. The method as claimed in claim 6, wherein said hydrogen-eliminating or hydrogen-accepting additive is a hydrogen acceptor or a basic material containing at least one nitrogen atom having a lone electron pair.

8. The method as claimed in claim 6, wherein said electrolyte is selected from the group consisting of inorganic and organic salts, double salts, complex salts and ionic dyes which are soluble in said solvent and are capable of dissociating into ions.

9. The method as claimed in claim 6, wherein said electrolyte is selected from the group consisting of (n-C₄H₉)₄NClO₄, (C₂H₅)₄NBF₄,(C₂H₅)NHSO₄,

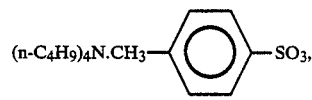

(C₂H₅)₄NPF₆, LiClO₄, NaAsF₆, AgBF₄ and Rose Bengale.

10. The method as claimed in claim 6, wherein the concentration of said electrolyte is in the range of 0.01 mol/l to 1.0 mol/l.

11. The method as claimed in claim 6, wherein the concentration of said N,N'-diphenylbenzidine is in the range of 0.01 mol/l to 1.0 mol/l.

12. The method as claimed in claim 6, wherein said organic solvent is selected from the group consisting of acetonitrile, benzonitrile, propylene carbonate, alcohol, dimethyl formamide, nitrobenzene, N-methylpyrrolidone, tetrahydrofuran and dimethyl sulfoxide.

13. The method as claimed in claim 6, wherein said hydrogen-eliminating or hydrogen-accepting additive is selected from the group consisting of pyridine, lutidine, collidine, pyrazine, pyriazine, pyrimidine, triazine and a trialkylamine.

14. The method as claimed in claim 6, wherein the concentration of said hydrogen-eliminating or hydrogen-accepting additive is in the range of 1/100 mole to 20 moles with respect to 1 mole of said N,N'-diphenylbenzidine.

15. The method as claimed in claim 6, wherein said hydrogen-eliminating or hydrogen-accepting additive is selected from the group consisting of pyridine, lutidine, and collidine.

* * * * *